Sept. 11, 1945.  C. F. WAIT  2,384,659
TRAILER
Filed Dec. 13, 1943  3 Sheets-Sheet 3
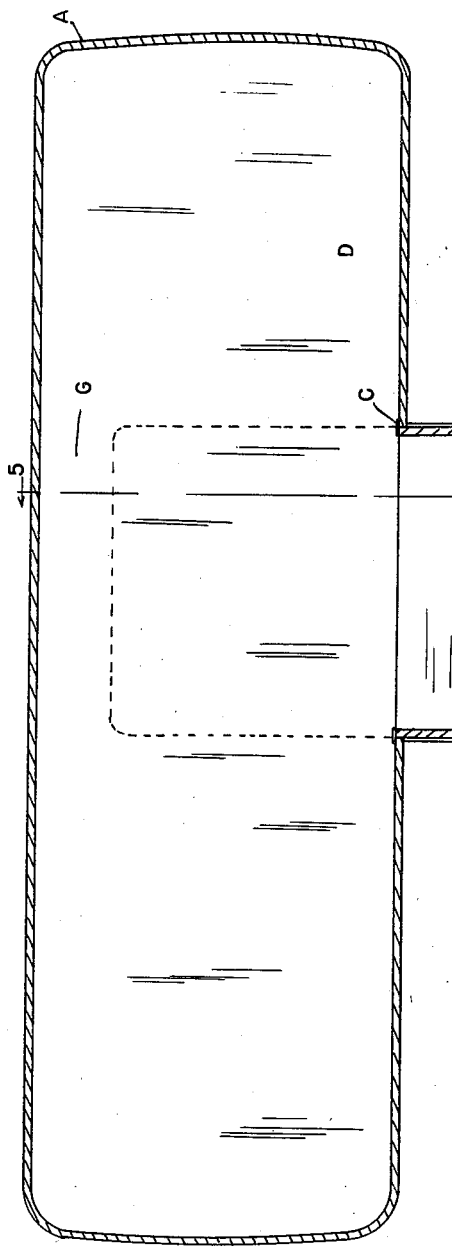
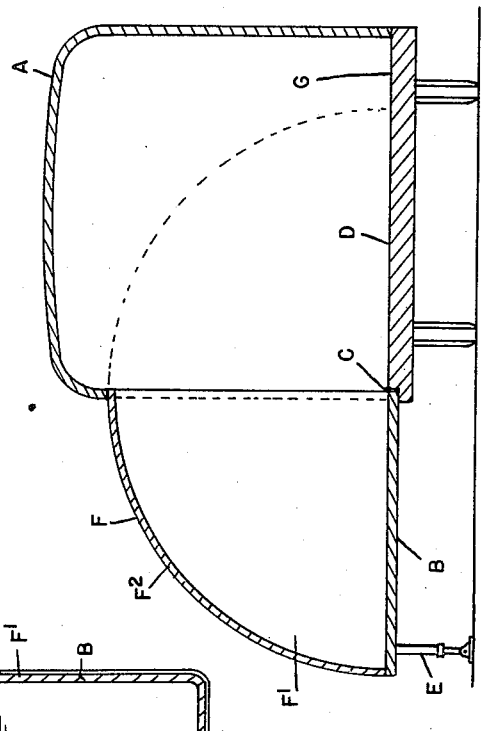
FIG.4.
FIG.5.
INVENTOR.
CLYDE F. WAIT
BY
ATTORNEYS Patented Sept. 11, 1945

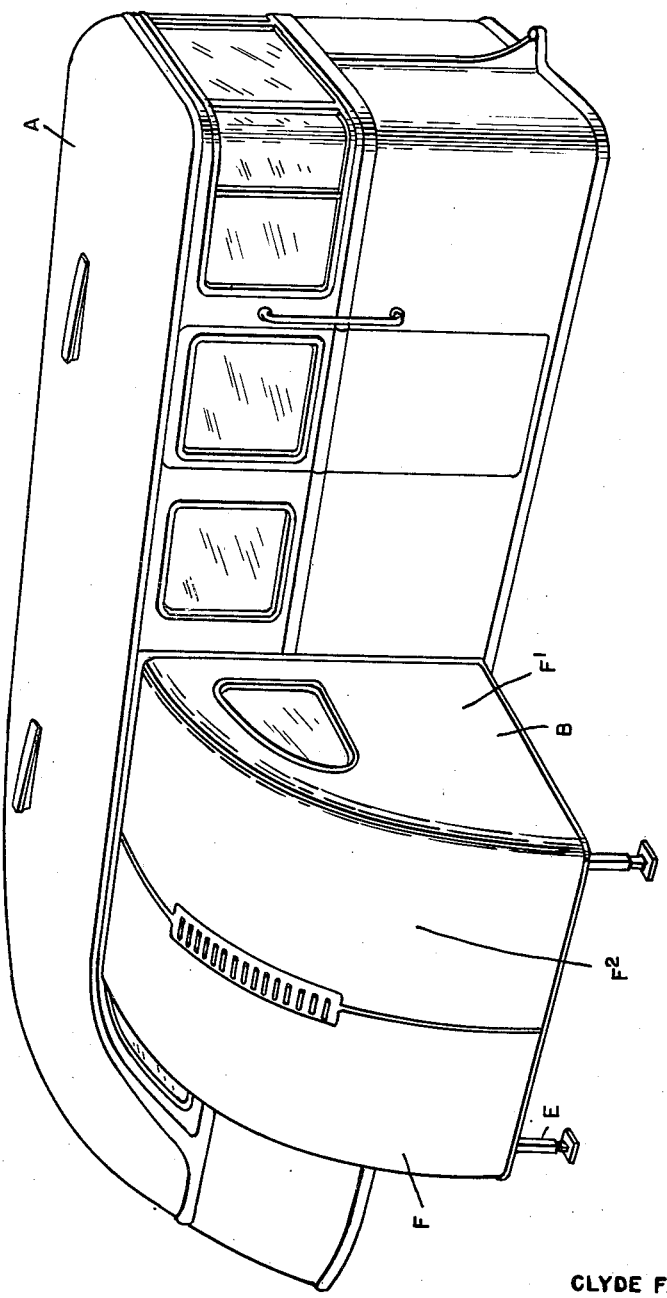

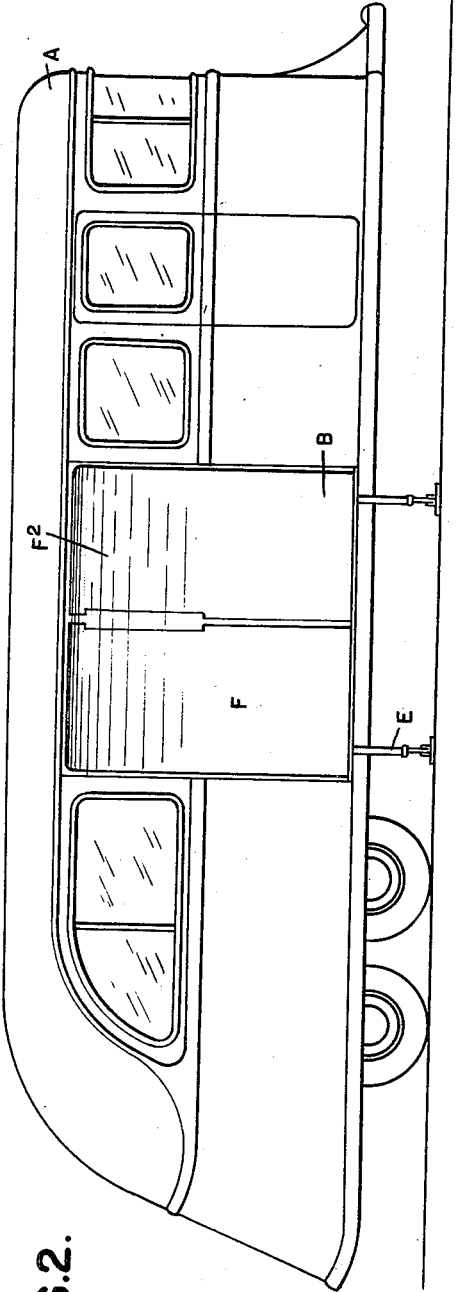
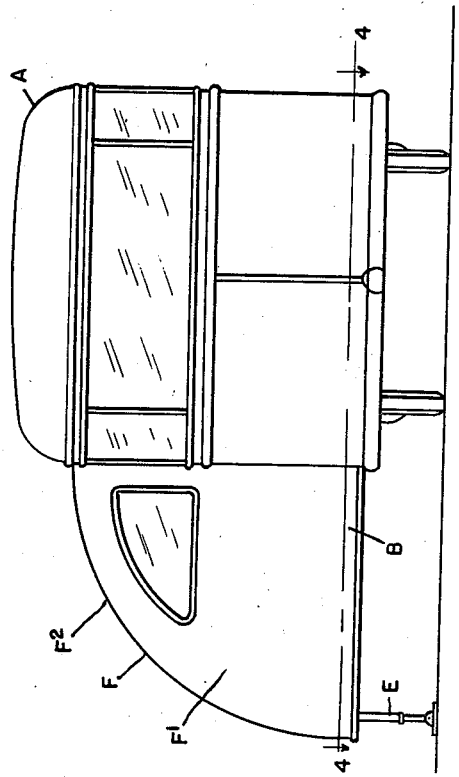

2,384,659

UNITED STATES PATENT OFFICE 2,384,659

TRAILER

Clyde F. Wait, Flint, Mich., assignor to Palace Corporation, Flint, Mich., a corporation of Michigan Application December 13, 1943, Serial No. 514,126

2 Claims. (Cl. 296—26)

The invention relates to automobile trailers and more particularly to that type capable of expansion when not in transit.

It is the object of the invention to obtain a very simple construction of expansion section which can be quickly manipulated to change from contracted to expanded position. To this end the invention consists in the construction as hereinafter set forth.

In the drawings:

Fig. 1 is a perspective view of my improved trailer showing the same in expanded position;

Fig. 2 is a side evelation;

Fig. 3 is an end elevation;

Fig. 4 is a horizontal section on line 4—4, Fig. 3; and

Fig. 5 is a vertical cross section on line 5—5, Fig. 4.

A is the main body of the trailer which may be of any suitable construction and which is of dimensions in height and width permissible for transit over highways. One side wall of this trailer is provided in the central portion thereof with a movable section B which has a hinge C connecting it with the floor D. This permits of turning down the section B into the plane of the floor to form a lateral extension thereof which may be supported at its outer end by suitable jacks E. Secured to the inner face of the section B is a hood F in the form of a quadrant having front and rear walls F' and an arcuate wall F². Thus, when the section B is in the position in alignment with the side wall, the hood will be in the position shown in dotted lines in Fig. 5 where it rests upon the floor D. However, the dimension of the quadrant is such that there is still left within the trailer a passageway G between the same and the opposite side wall.

With the construction as described, all that is necessary to expand the trailer when in camp is to pull down the section B and place the jacks E under the outer end thereof. This will give sufficient room for the arrangement of a cot or cots transversely of the trailer and will thus increase its sleeping capacity. On the other hand, to restore the trailer in condition for transit, the section B is swung upward on its hinge into alignment with the rest of the side wall and with the hood F resting upon the floor D. The weight of the hood will hold the section B in closed position but, if desired, any suitable fastener may be used for holding the parts in this position.

What I claim as my invention is:

1. The combination with an enclosed trailer of a movable section in a side wall thereof hinged at its lower end to swing down into alignment with the trailer floor, and a hood in the form of a rigid quadrant permanently secured to the inner face of said movable section at top and sides thereof and forming in the downturn position of the latter an enclosure having parallel end walls and an arcuate side and top wall said quadrant being stored within said trailer in the up position of said section and fitting the side and top of the opening in the side wall when said movable section is turned down.

2. The combination with an enclosed trailer of a movable section in a side wall thereof having a continuous hinge connecting its lower end with the trailer floor and permitting of the turning down of said section into the plane of the floor, and a rigid quadrant hood permanently secured to the inner side of said section adapted in the downturn position of the latter to form an enclosure above the same fitting the sides and top of the opening in the side wall and which is in open communication with the interior of the trailer said quadrant in the up position of said section being stored within a portion of the width of said trailer but leaving a passage beside the same connecting the space forward and rearward thereof.

CLYDE F. WAIT.